Aug. 18, 1970 F. CAPRARI 3,525,016
APPARATUS FOR REGULATING THE LIGHT OUTPUT OF A FLASH LAMP
Filed Oct. 23, 1967
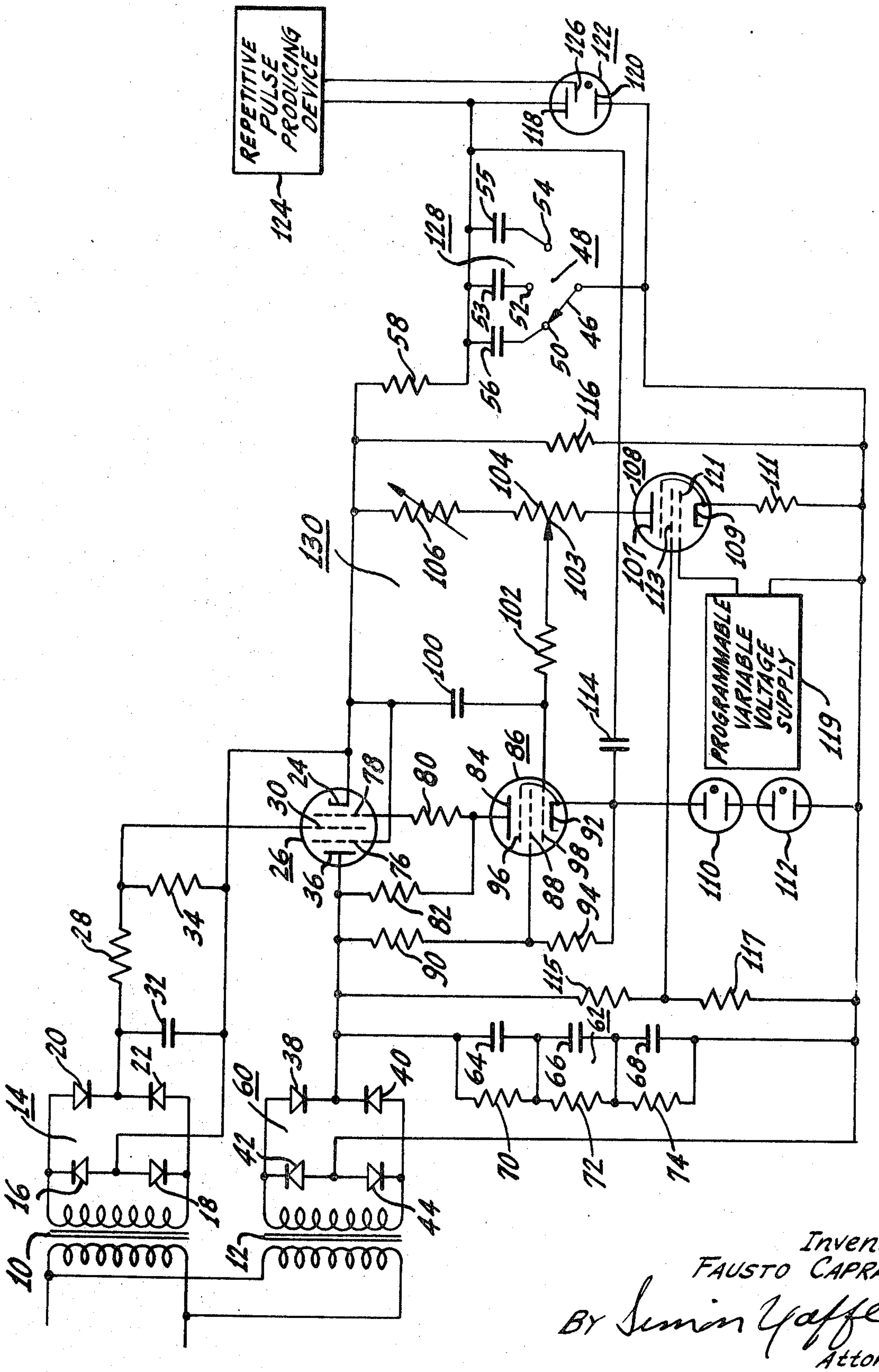
Inventor:
FAUSTO CAPRARI
BY Simon Yaffee
Attorney

3,525,016
APPARATUS FOR REGULATING THE LIGHT OUTPUT OF A FLASH LAMP

Fausto Caprari, Jersey City, N.J., assignor to RCA Corporation, a corporation of Delaware Filed Oct. 23, 1967, Ser. No. 677,323
Int. Cl. H05b *37/00*
U.S. Cl. 315—241 4 Claims

ABSTRACT OF THE DISCLOSURE

For certain purposes it is necessary to take a series of pictures using a flashing light to illuminate the object with the same intensity of light for all pictures of the series. It also may be necessary to take the several pictures of a series at short intervals. A low impedance voltage regulated power supply for charging a storage capacitor is described which is useable with a light source to provide closely spaced, short flashes of light of the same intensity.

BACKGROUND

This invention relates to a regulated power supply and more particularly to flash lamp energizing apparatus including the regulated power supply.

In certain industrial operations such as in producing transistors and integrated circuits in large quantities, photographic processes are used. For the transistors and the integrated circuits to be useful as elements of mass produced circuits or equipments, all transistors or integrated circuits of the same type must be uniform in operating characteristics.

In making transistors or integrated circuits by the photoresist processes, a photographic mask is produced. One reticle is applied to a transparency and the reticle is photographed several times to produce the mask. A flash of light shines through the transparent portion of the reticle to produce an image thereof. The image is reduced in size and the image is projected onto the photosensitive mask. When the flash has expired, the mask is moved with respect to the reticle and another flash of light is produced to cause exposure of an adjacent portion of the mask to the image of the same reticle. This process is repeated as many times as is desired to provide many images of the reticle on the mask. The mask when completed is used in the making of transistors and integrated circuits by the photoresist process. For all of the transistors and integrated circuits made with the mask to be uniform, the images projected on the mask must be of the same intenstiy, and to speed up the process of making the mask, the flashes must follow each other at very short intervals.

A known way to produce a flash of light for photographic purposes is to charge a storage capacitor to a high voltage and to discharge the capacitor through a gas-filled flash lamp. The intensity of the light depends on both the size of the storage capacitor and on the voltage of the charge stored therein. Therefore, to obtain a series of flashes of light of the same intensity, the capacitor must charged to the same voltage between successive discharges thereof. Also, to speed the operation of the photographic processes in which the flash and lamp are used, the storage capacitor must be recharged very quickly after it has been discharged.

It is an object of this invention to provide an improved means for rapidly recharging a capacitor each time it is discharged to a uniform voltage.

It is a further object of this invention to provide an improved photoflash device which produces successive flashes of light of the same intensity and at short intervals.

SUMMARY

According to the invention, a low impedance voltage regulated power supply is provided for charging a storage capacitor, whereby each time the capacitor is discharged it will be charged again rapidly by the low impedance voltage regulated power supply to the same voltage level. The storage capacitor may be used to supply a flash lamp. To permit the storage capacitor to discharge below the deionization voltage of the flash lamp, whereby the flash lamp extinguishes between successive flashes and to prevent the rapid charge from destroying elements of the power supply, means are provided to permit substantially complete discharge of the storage capacitor and also to reduce the charging rate of the capacitor by the voltage regulated power supply to a safe value. This substantially complete discharge of the storage capacitor and also the reduction of charging may be accomplished by momentarily reducing the voltage of a voltage standard means which comprises a portion of the regulated power supply, to a low value as soon as the storage capacitor is discharged. During the period of charging of the capacitor, the voltage standard is restored to its normal operational value, whereby rapid, safe charging of the storage capacitor to a regulated voltage takes place.

The main electrodes of the gas-filled flash lamp are connected across the storage capacitor and starting pulses are applied between the starting electrodes of the flash lamp to cause the gas therein to ionize and therefore to cause the flash lamp to discharge the capacitor. Since the storage capacitor has been charged to a predetermined voltage before discharge thereof, the flashes of light produced by successive discharges of the storage capacitor through the flash lamp produces flashes of light of uniform intensity. Since the voltage across the capacitor is reduced to below the deionization voltage of the flash lamp after each flash, the flash lamp extinguishes between flashes. Due to the reduction of the voltage of the voltage standard, rapid recharging of the storage capacitor takes place without destroying the voltage regulated power supply, whereby the flash lamp may be ionized periodically in quick succession to produce a series of separate flashes of light of uniform intensity at short intervals.

If it be desired to change the illumination of one portion of the reticle with respect to another during the photographic process, means, which may be programmable, are provided to vary the output voltage of the voltage regulated supply to charge the storage capacitor to different voltages.

BRIEF DESCRIPTION OF THE DRAWING

The invention will be more readily understood upon reading the following description in connection with the accompanying drawing in which the sole figure illustrates an embodiment of this invention.

DESCRIPTION

As shown in the figure, the primary windings of two iron core transformers 10 and 12 are connected in parallel to a source of alternating current (not shown). The secondary winding of the transformer 10 supplies a full wave rectifier 14 comprising a first pair of rectifying diodes 16 and 18 whose anodes are connected together and whose cathodes are connected to the terminals of the secondary winding of the transformer 10. The rectifier 14 also includes a second pair of diodes 20 and 22, whose cathodes are connected together and whose anodes are connected to the terminals of the secondary winding of the transformer 10. The junction of the diodes 16 and 18 is connected directly to the cathode 24 of a pentode 26. The junction of the diodes 20 and 22 is connected through a filter resistor 28 to the screen grid 30 of the pentode 26. A filter capacitor 32 is connected between the junction of the diodes 20 and 22 and the junction of the diodes 16 and 18. A bleeder resistor 34 is connected between the cathode 24 and the screen grid 30 of the pentode 26. Therefore, a filtered positive potential which is substantially independent of the load, to be mentioned, is applied between the cathode and the screen grid of the pentode 26 by the rectifier 14.

The anode 36 of the pentode 26 is connected to the junction of the cathodes of two diodes 38 and 40, the anodes of the diodes 38 and 40 being connected to the terminals of the secondary winding of the transformer 12. The junction of the anodes of two further diodes 42 and 44 is connected to the moving element 46 of a single-pole triple-throw switch 48. The cathodes of the diodes 42 and 44 are connected to the terminals of the secondary winding of the transformer 12. The moving element 46 of the switch 48 contacts one of the three contactors 50, 52 or 54 comprising part of the switch 48. One terminal of a storage capacitor 56 is connected to the contactor 50. The other terminal of the capacitor 56 is connected through a current limiting resistor 58 to the cathode 24 of the pentode 26. The contactors 52 and 54 are connected to one terminal of respective storage capacitors 53 and 55. The other terminals of the capacitors 53 and 55 are also connected through the resistor 58 to the cathode 24. The capacitors 56, 53 and 55 are all different sizes for a purpose to be disclosed.

The diodes 38, 40, 42 and 44 comprise a full wave rectifier 60. A filter 62 for the rectified current provided by the rectifier 60 comprises three filter capacitors 64, 66 and 68 connected in series between the terminals of the rectifier 60 comprising the junction of the diodes 42 and 44 and the junction of the diodes 38 and 40. Voltage equalizing resistors 70, 72 and 74 are connected across capacitors 64, 66 and 68 respectively for the purpose of equalizing the voltage applied across each of these three capacitors.

The suppressor grid 76 of the pentode 26 is connected to its cathode 24. The control grid 78 of the pentode 26 is connected to the anode 36 through two resistors 80 and 82 in series. The junction of the resistors 80 and 82 is connected to the anode 84 of a second pentode 86. The screen grid 88 of the pentode 86 is connected to the anode 36 through a resistor 90. The screen grid 88 is also connected to the cathode 92 of the pentode 86 by way of a resistor 94. The suppressor grid 96 of the pentode 86 is connected to the cathode 92 internally of the envelope of the pentode 86. The control grid 98 of the pentode 86 is connected through a filter capacitor 100 to the cathode 24 of the pentode 26. The control grid 98 is also connected, by way of a resistor 102 to the slider 103 of a potentiometer 104. The respective terminals of the potentiometer 104 are connected by way of a variable resistor 106 to the cathode 24 and to the anode 107 of a pentode 108. The cathode 109 of the pentode 108 is connected by way of a bias resistor 111 to the junction of the diodes 42 and 44. The screen grid 113 of the pentode 108 is connected by way of respective resistors 115 and 117 across the terminals of the rectifier 60. A programmable variable voltage supply 119 is connected between the control grid 121 of the pentode 108 and the junction of the diodes 42 and 44.

The cathode 92 of the pentode 86 is connected through two gas-filled tubes 110 and 112 to the junction of the diodes 42 and 44. The junction of the cathode 92 and the gas-filled tube 110 is connected through a blocking capacitor 114, to the junction of the three capacitors 56, 53 and 55. A current bleeding resistor 116 is connected between the cathode 24 and the junction of the diodes 44 and 42. The heater circuits for the pentodes 26, 86 and 108 are not shown.

The main electrodes 118 and 120 of a high pressure gas-filled lamp 122 are connected respectively to the junction of the capacitors 56, 53 and 55 and to the moving element 46 of the switch 48. A source 124 of repetitive pulses is connected between the starting electrode 126 of the lamp 122 and another electrode 118 thereof.

In the circuit as described, one of the capacitors 53, 55 and 56, the resistor 58 and the flash lamp 122 comprise a load 128 for a low impedance voltage regulated power supply 130 comprising all the other elements mentioned except for the switch 48 and the capacitor 114. The purpose of the switch 48 is to choose which one of the capacitors 53, 55 or 56 will be charged by the regulator 130, and the capacitor 114 provides protection for the regulator 130 as will be explained.

Upon energizing the regulator 130, a negative potential will be applied to the control grid 78 of the pentode 26 with respect to the cathode 24 thereof which depends on the voltage at the slider 103 of the potentiometer 104, and is of such value as to control the resistance of the pentode 26 to keep the voltage across the load 128 constant. If the voltage across the load goes below a value determined by the position of the slider 103, the resistance of the pentode 26 will be reduced to cause charging of one of the capacitors 56, 53 or 55 that is connected to the moving element 46. That is, in a known manner, the voltage on the slider 103 is compared with the voltage across the gas-filled tubes 110 and 112, which comprise a voltage standard, and the resistance of the pentode 26 is adjusted to adjust the current fed to the load 128 by the regulator 130 to keep the voltage across the load 128 at a value related to the voltage on the slider 103. When, as will be more fully explained, the voltage drop across the two tubes 110 and 112 is reduced, the voltage standard of the regulator 130 is reduced and the charging rate of the regulator 130 is adjusted to a value dependent on the relationship of the voltage across the load 128 and the reduced standard voltage. The pentode 26 and the values of the other elements comprising the regulator 130 are so chosen as to permit very rapid charging of the load 128. The size of the resistor 58 is chosen so as to assist in limiting the charging rate of the capacitor that is being charged to a safe value, but is not so large as to substantially slow down the charging of the capacitor that is being charged.

Each time the pulsing device 124 produces a pulse which is applied between the main electrode 118 and the starting electrode 126 of the flash tube 122, the flash tube 122 becomes ionized, and the current in one of the storage capacitors 56, 53 or 55 is discharged through the flash tube 122 producing an amount of light depending on the charge of the storage capacitor that is discharged. Since this storage capacitor is charged to a predetermined voltage determined by the setting of the slider 103, the amount of light produced by the flash lamp 122 in successive flashing thereof, with any one setting of the switch 48, will all be equal. The amount of light can be varied in steps by connecting different ones of the several capacitors 56, 53 and 55 to the switch arm 46, these capacitors, as noted above, having different values. The amount of light may also be varied in small increments by moving the slider 103.

Also, by means of the pentode 108 and the programmable voltage supply 119 the charging voltage for the capacitor and therefore the amount of light given off by the lamp 122, may be programmed to illuminate various portions of the reticle differently as may be required in making the mask.

When the flash lamp 122 is ionized, the voltage thereacross drops to a very low value, whereby the voltage across the discharged capacitor also drops to a very low value. The voltage regulated power supply 130 will then throw a very heavy charge current into the discharge storage capacitor to recharge it, this current being limited, as noted above, to a certain extent by the resistor 58. If the resistor 58 were made large enough to limit the capacitor charging current provided by the power supply 130 to a value that would not harm the components of the power supply 130, the charging of the storage capacitor would be too slow to provide repeated flashes of the lamp 122 at a required high rate. The connection of the capacitor 114 between the junction of the capacitors 56, 53 and 55 to the junction of the gas tube 110 and the cathode 92 momentarily reduces the standard voltage developed across the gas-filled tubes 110 and 112 to the same value as the voltage across the lamp 122 whereby the regulated voltage supplied by the voltage regulator 130 is greatly reduced and whereby the charge current flowing into the storage capacitor is reduced to a safe value. Due to the direct current blocking effect of the capacitor 114, the voltage reducing effect of the capacitor 114 is only momentary and the voltage across the two gas-filled tubes 110 and 112 builds up very quickly. However, while the capacitor 114 is providing its voltage standard reducing effect, the charging current that is supplied to the storage capacitor is reduced to the point when the voltage across the storage capacitor drops below the deionization potential of the flash tube 122. As the charging period continues, the voltage standard produced by the diodes 110 and 112 increases, whereby the voltage regulator 130 raises the voltage across the storage capacitor to the fully charged voltage value without destroying any of the elements of the voltage regulated power supply 130. Furthermore, the charging of the storage capacitor by the supply 130 including the capacitor 114 takes place much quicker than if the current limiting resistor 58 were made large enough to itself keep the charging rate for the storage capacitor to a safe value.

Various modifications of the described regulated power supply can be employed. For example, the power supply may be transistorized. If desired, the pentode 108 and its connections may be omitted, a variable resistor (not shown) then being connected between the terminal of a resistor 104 and the junction of the diodes 42 and 44. Therefore, the above-description should be considered as illustrative and not in a limiting sense.

What is claimed is:

1. A regulated power supply for a load whose impedance can vary rapidly from a high value to a low value comprising:

low impedance means for supplying current at a regulated voltage to said load, voltage standard means, means to compare the voltage across said load with the voltage across said standard means and to vary said low impedance means according to the difference between said compared voltages, and a connection for sensing the voltage across said load and for applying the voltage across said load to said voltage standard means to momentarily reduce the voltage of said voltage standard means when the impedance of said load arrives at its low value, said connection comprising a capacitor which is series connected between said load and said voltage standard means.

2. A regulated power supply comprising:

an electronic device having a pair of main electrodes and a control electrode, a pair of terminals for a load, a connection between a terminal of a source of current to one of said main electrodes, a connection between a load terminal and the other of said main electrodes, a connection between the other load terminal and another terminal of said source, a voltage standard means, a first means for sensing the voltage appearing across said load terminals, means for comparing the voltage sensed by said first voltage sensing means and the voltage of said voltage standard means, means for applying a voltage produced by said comparing means to the control electrode of said electronic device, a second means for sensing the voltage across said load terminals, and means for momentarily reducing the voltage of said voltage standard means responsive to a reduction in voltage of said load terminals as sensed by said second voltage sensing means.

3. The invention as expressed in claim 2 in which said last-mentioned means comprises a blocking capacitor and in which the load comprises a storage capacitor.

4. The invention as expressed in claim 2 in which said second voltage sensing means comprises a blocking capacitor and in which the load comprises a storage capacitor and in which the main electrodes of a flash lamp are connected across said storage capacitor, said flash lamp including a gas-filled enclosure having a pair of main electrodes and a control electrode, means for connecting the flash lamp main electrodes across said storage capacitor, and means for applying ionizing potentials to the control electrode of said flash lamp.

References Cited

UNITED STATES PATENTS 3,375,403 3/1968 Flieder ............ 315—240

JERRY D. CRAIG, Primary Examiner

U.S. Cl. X.R.

315—200